H. R. HUGHES.
WELL REAMER.
APPLICATION FILED FEB. 24, 1914.
1,139,529.
Patented May 18, 1915.
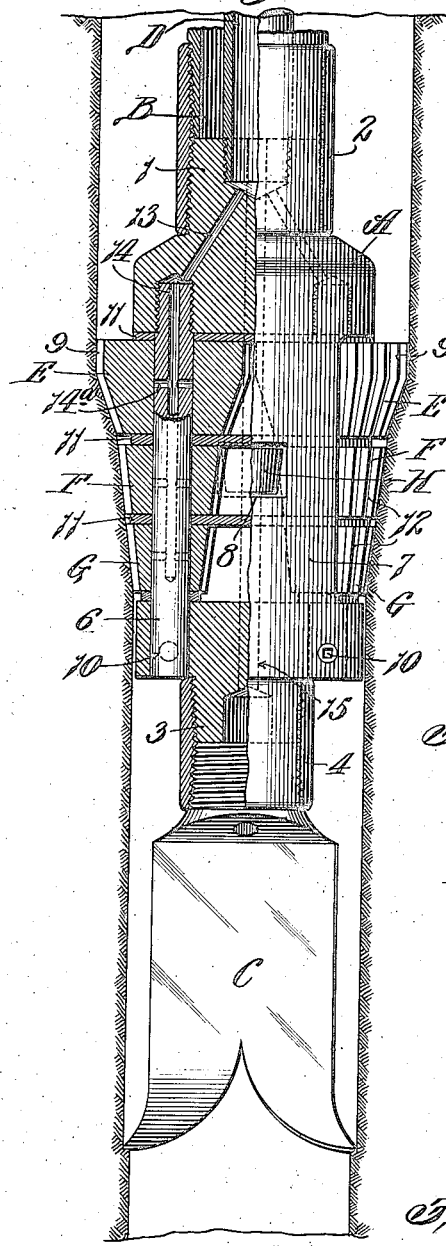
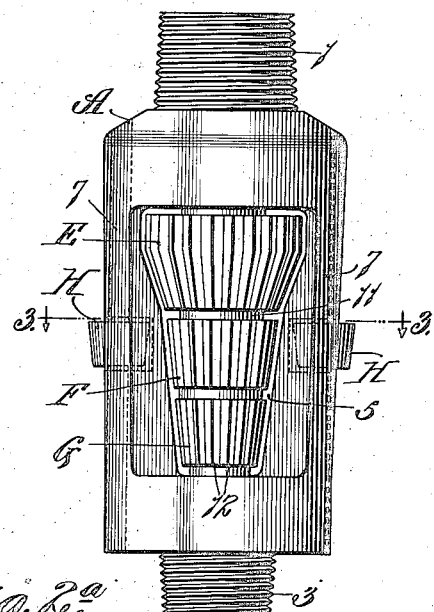
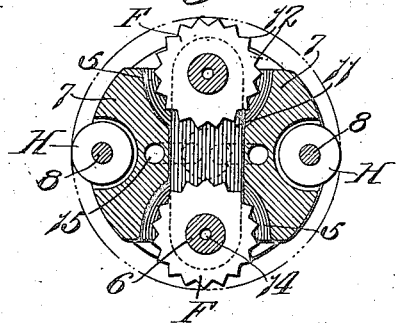
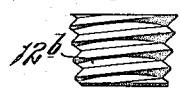
Witnesses:
Geo. R. Ladson
C. M. Badger
Inventor,
Howard R. Hughes.
By Bakewell & Church attys.

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

WELL-REAMER.

1,139,529.  Specification of Letters Patent.  Patented May 18, 1915.

Application filed February 24, 1914. Serial No. 820,672.

*To all whom it may concern:*

Be it known that I, HOWARD R. HUGHES, a citizen of the United States, residing at Houston, Texas, have invented a certain new and useful Improvement in Well-Reamers, of which the following is a full, clear, and exact description, such as will enable others skilled in the art to which it appertains to make and use the same.

This invention relates to reamers such as are used in well-drilling operations for reaming out or increasing the diameter of a hole that has become crooked, due to canting of the drill, or which has become smaller than the required diameter, due to dulling or wearing away of the cutters on the drill.

One object of my invention is to provide a lubricated well-reamer, namely, a reaming tool equipped with rotatable cutters that remove the material from the side of the hole and thus straighten the hole or increase the diameter of same, and means for supplying a lubricant to the bearings on which said cutters turn.

Another object is to provide a rotary cutter reamer which is so designed that there is little tendency for it to wabble when it is in use, thereby insuring the formation of a straight hole of approximately uniform diameter. And still another object is to provide a reaming tool that consists of a head which is adapted to be connected to an ordinary drill stem and cutters housed in the head and arranged in such a manner that the cutting surfaces of same shear off the material from the side of the hole and gradually increase the diameter of the hole as the head descends, said cutters being mounted on spindles or shafts that are supported in the head in such a manner that there is little danger of their being bent or sheared off when the reamer is in use.

Other objects and desirable features of my invention will be hereinafter pointed out.

Figure 1 of the drawings is a side elevational view, partly in vertical section, of a well-reamer constructed in accordance with my invention, illustrating the reamer attached to a drill stem and provided with a drill bit; Fig. 2 is a side elevational view of my improved reamer; Fig. 2ª is a perspective view of a steadying roller provided with a cutting surface; Fig. 3 is a horizontal sectional view of same taken on approximately the line 3—3 of Fig. 2; and Figs. 4, 5 and 6 are elevational views illustrating the different kinds of cutting surfaces the cutters can be provided with.

Referring to Figs. 1 to 3 of the drawings which illustrate one form of my invention, A designates the head of the reamer which preferably consists of a block of metal provided at its upper end with a screw-threaded portion 1 for coöperating with a coupling sleeve 2 that connects the reamer to a drill stem B, and provided at its lower end with a screw-threaded portion 3 so as to enable a drill bit C, either a fish-tail or a rotary bit, to be connected to the lower end of the reamer by means of a coupling sleeve 4, as shown in Fig. 1. Pockets 5 are formed in the sides of the head at oppositely-disposed points so as to receive two gangs of horizontally-disposed cutters E, F and G, the cutters of each gang being rotatably mounted one above the other on a vertically-disposed shaft 6 whose opposite ends are supported in bearings in the head A, as shown in Fig. 1. The side portions 7 of the head, which lie between the pockets 5, are equipped with horizontally-disposed steadying rollers H that are rotatably mounted on vertically-disposed spindles 8, said steadying rollers being set into recesses or grooves formed in the side portions 7 of the head, as shown in Fig. 3, and provided with plain surfaces, as shown in Fig. 2, or cutting surfaces, as shown in Fig. 2ª. The cutters E, F and G are tapered slightly so that each gang, when considered as a unit, forms a substantially inverted frusto-conical-shaped cutter that revolves about a vertical axis, and while I prefer to use a number of small cutters to form each of these inverted frusto-conical-shaped cutters, I wish it to be understood that my invention is not limited to such a structure, for, if desired, a single cutter of the general outline of the three individual cutters E, F and G could be mounted on each of the spindles 6. The upper cutters E are preferably provided at their upper ends with straight or non-tapered portions 9 whose cutting surfaces extend parallel to the drill stem and thus form a hole that has straight side walls. The spindles 6 on which the cutters are rotatably mounted, can be connected to the head in any suitable way, the spindles herein shown having their upper end portions screwed into the top part of the head and their lower end portions engaged by set-screws 10 mounted in the lower part of the head, as shown in Fig. 1. In order to reinforce and strengthen the spindles 6 and thus reduce the tendency of said spindles to bend or shear off when the reamer is in use, I have provided the reamer with tie-members 11 that extend transversely across the head through the pockets 5, and which are provided with openings through which the spindles 6 pass, said tie-members being arranged between the cutters and between the upper cutters E and the top portion of the head so that they serve as washers as well as tie-members. The cutters can be provided with any suitable type of cutting surfaces, either straight chisel-teeth 12, as shown in Figs. 1 and 2, inclined chisel-teeth 12$^a$, as shown in Fig. 4, spiral cutting teeth 12$^b$, as shown in Fig. 5, or sharp-pointed projections or protuberances 12$^c$, as shown in Fig. 6.

In order to eliminate the tendency of the cutters to wear out rapidly I have provided the reamer with means for lubricating the bearings of the cutters. Said means preferably consists of a lubricant-holder D mounted on the head A and projecting upwardly into the hollow drill stem B so that the pressure of the flushing water that is pumped downwardly through the drill stem will be exerted on the lubricant in the holder D and thus cause said lubricant to flow through ducts 13 in the head that lead to ducts 14 in the spindles or supporting shafts 6 of the cutters, said ducts 14 having branches 14$^a$, as shown in Fig. 1, that lead to the outer surfaces of the spindles 6 on which the cutters turn. The head A is provided with water-courses or passageways 15 for the flushing water that is pumped down through the drill stem when the reamer is in use, said water passageways terminating at the lower end of the head.

The steadying rollers H are preferably mounted in the head A in such a manner that they project laterally from the head approximately the same distance as the intermediate cutters F, as shown in Fig. 3, thereby producing four points of contact with the side wall of the hole that prevents the head from wabbling and insures the formation of a straight hole. The head A of the reamer is exceptionally strong and rigid as the top and bottom portions of same are tied together by the integral side portions 7 of the head, and the vertically-disposed spindles or shafts 6 on which the cutters are mounted are not liable to bend or be sheared off when the reamer is in service, owing to the fact that they are tied together by the tie-members 11. The shape of the cutters also tends to reduce the side strains or shearing strains on the spindles 6 for said cutters are tapered slightly and consequently act on the material at the side of the hole in such a manner that the weight imposed upon the reamer tends to move the cutters longitudinally of their supporting shafts or spindles toward the top portion of the head A.

A reamer of the construction above-described can be used for a long period without withdrawing it from the hole, owing to the fact that it comprises an adequate lubricating means for the cutters which prevents the cutters or their supporting shafts or spindles from wearing out quickly. Such a reamer will straighten out a hole or increase the diameter of a hole quickly on account of the exceptionally large cutting area on same that is presented to the side wall of the hole. The reamer can be manufactured at a low cost on account of its simple construction, and the cutters of same can be replaced easily by simply removing the supporting spindles 6 which are detachably connected to the head. Furthermore, a reamer of the construction above-described insures the formation of a straight hole in view of the fact that it comprises rotatable devices that bear against the side wall of the hole at a sufficient number of points to prevent the head from wabbling when the reamer is in use.

Having thus described my invention, what I claim as new and desire to secure by Letters Patent is.

1. A well reamer comprising a head that consists of a casting which is provided with a top portion, a bottom portion and spaced side portions all integrally connected together, upright spindles arranged between said side portions with their ends seated in the top and bottom portions of the head, a tapered cutting device rotatably mounted on each of said spindles and composed of a group of small cutters arranged one above the other, and a transverse tie member arranged intermediate the upper and lower ends of said spindles and engaged with said spindles.

2. A well-reamer consisting of a head provided with a top and bottom portion and spaced side portions integrally connected together, upright shafts or spindles connected to the top and bottom portions of the head, cutters rotatably mounted on said spindles for removing the material from the side of the hole, tie washers arranged between said cutters and serving to tie said spindles together, and steadying rollers projecting laterally from the head intermediate said cutters.

3. A well reamer comprising a head provided with a top portion, a bottom portion and spaced side portions all integrally connected together, said head having water courses or passageways extending longitudinally through same, upright spindles arranged between said side portions with their ends seated in the top and bottom portions of the head, tapered cutting devices rotatably mounted on each of said spindles, a transverse tie member arranged intermediate the top and bottom portions of the head and engaged with said spindles, and a lubricant holder on the head, the head and said spindles being provided with ducts for conveying the lubricant from said holder to the surfaces on which said cutting devices turn.

In testimony whereof I hereunto affix my signature in the presence of two witnesses, this 16" day of February, 1914.

HOWARD R. HUGHES.

Witnesses:
L. A. GODBOLD,
C. S. REED.